Oct. 27, 1959   J. DI NICOLA   2,910,272
HORIZONTAL TYPE PULLEY FOR CLOTHESLINES
Filed Aug. 28, 1956

INVENTOR.
Joseph Di Nicola
BY
*L. S. Saulsbury*
ATTORNEY 2,910,272

HORIZONTAL TYPE PULLEY FOR CLOTHESLINES

Joseph Di Nicola, Brooklyn, N.Y.

Application August 28, 1956, Serial No. 606,725

3 Claims. (Cl. 254—190)

This invention relates to a horizontal type pulley for clotheslines.

It is the principal object of the present invention to provide a horizontal type pulley for clotheslines in which the clothesline can run through and around the pulley with the clothespins and with the knot tying the ends of the line together without any possible chance of the clothesline being released from the pulley.

It is another object of the invention to provide a horizontal type clothesline pulley which has a tapered or variable width loop projection adapted to be extended over a hook on a fixed support in such a manner as to cause the pulley to be retained rigidly in its fixed horizontal position.

It is still another object of the invention to provide a horizontal type pulley in which the pulley is flared on its bottom end to support the clothes line as it passes therearound and is recessed on its upper end to receive a tapered centering projection to hold the pulley against lateral displacement and to assume the lateral pull of the line from a pin as the pulley is rotated thereon and on the lower end of the pin there is a thrust washer for supporting the pulley element and on which the pulley element rotates.

A further object of the invention resides in a pivot pin secured by welding to a housing and which passes through and supports the pulley elements.

Other objects of the invention are to provide a horizontal type pulley having the above objects in mind, which is of simple construction, inexpensive to manufacture, has a minimum number of parts, durable, not likely to get out of order, compact, of pleasing appearance and efficient in use.

Figure 1:
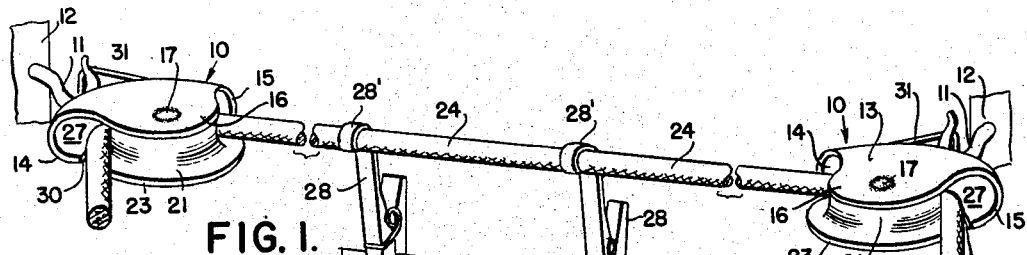
Figure 2:
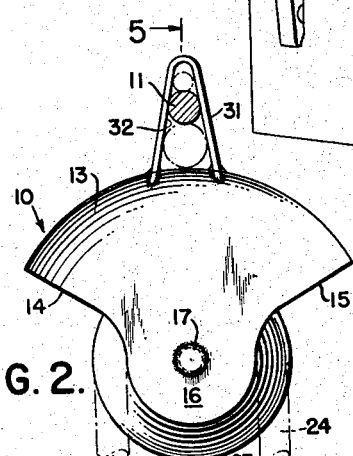
Figure 3:
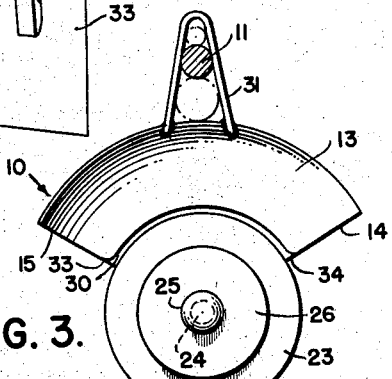
Figure 4:
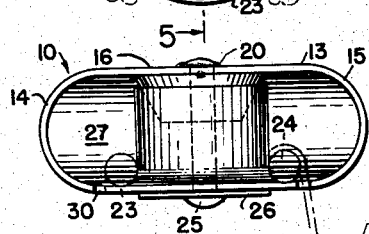
Figure 5:
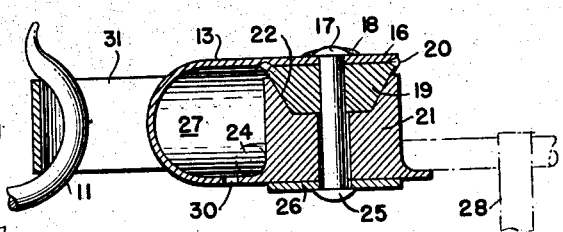
Figure 6:
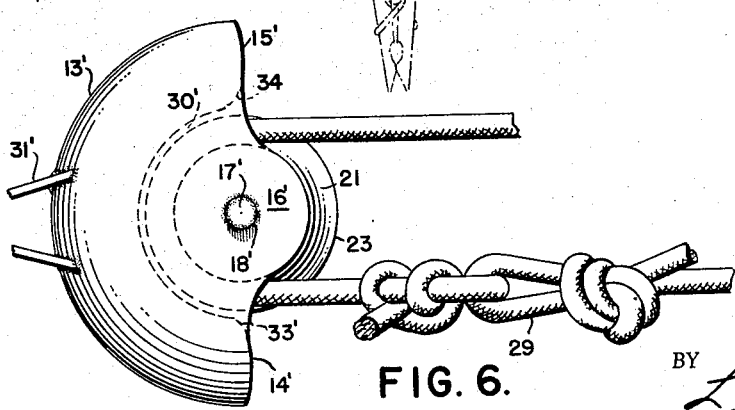

For a better understanding of the invention, reference may be had to the following detailed description taken in connection with the accompanying drawing, in which Figure 1 is a fragmentary perspective view of a clothesline arrangement on which more than two pulleys are mounted on supports with a clothesline extending between them, Fig. 2 is an enlarged top plan view of the pulley, Fig. 3 is an enlarged bottom plan view of the pulley, Fig. 4 is an end elevational view of the pulley looking into the guide shell openings, Fig. 5 is a longitudinal sectional view taken on line 5—5 of Fig. 2, and Fig. 6 is a top plan view of a modified form of a pulley that is adapted for use in a two pulley arrangement and showing a clothesline knot about to pass through the pulley.

Referring now particularly to Figs. 1 to 5, 10 represents pulleys embodying features of the present invention. Two or more of such pulleys can be connected between hooks 11 extending from supports 12 and spaced from one another. In the arrangement shown in Fig. 1 these pulleys are constructed for use with more than two supports. Each pulley has a hollow housing 13 of arcuate shape with open ends 14 and 15 lying at angle with respect to one another at approximately one hundred and twenty degrees apart. On the top of the housing 13 is a forwardly extending central portion 16. Depending through this portion 16 is a pivot pin 17 that has its head welded thereto at 18 to prevent it from turning. On the underside of this portion there depends a tapered centering member 19 that is welded at 20 to the portion and which has a frusto-conical surface. The pivot pin 17 extends through this centering member 19 and carries a pulley 21 having a tapered recess 22 adapted to receive the centering member 19 and a bottom flange 23 for supporting the clothesline 24. The lower end of the pivot pin has a head 25 which supports a thrust washer 26 on which the pulley element 21 turns.

The housing 13 between the open ends 14 and 15 thereof provides a large arcuate space 27 so as to accommodate clothes pins 28 and a large knot 29, Fig. 6, of clothesline 24 so that the movement of the clothesline through these pulleys is not at any time interrupted. A small arcuate space 30 is provided between the flange 23 of the pulley element and the housing 13 to further accommodate upstanding hook projection 28' of the clothespin 28 which is hooked upon and surrounds the clothesline 24. The pulley has an outwardly-extending loop 31 extending rearwardly from the middle of the housing and is adapted to receive the hook 11. The opening in this loop as indicated at 32 is tapered so as to receive different size hooks 11 and such that the hooks can be drawn toward the closed ends of the loop so as to be wedged between the sides thereof and since the sides of the loop have vertical height the pulley will be restrained against pivotal movement away from its horizontally-extended position with the flange 23 of the pulley element lying parallel with the ground surface. Thus, the pulley element is rigidly retained upon the hook 11 and the support 12. The pulley element 21 freely rotates on the pivot pin 17 and the walls of the recess 22 will provide a bearing surface for maintaining the pulley concentrically spaced upon the pin 17 so as to assume the lateral pull load of the clothesline and maintain the arcuate space 30 against being closed. With the pivot pin extending through the centering member 19 adequate support is provided for the pin so that it cannot be easily bent under the strain of the weighted clothesline and become loose. Any amount of clothing 33 can be loaded upon the line with the clothespins 28 and free movement of the clothing and the clothespins about the pulleys can be had. The housing at the ends of the arcuate slot are respectively cut away as indicated at 33 and 34 so that the clothespin projections 28' will be guided into the slot 30.

In Fig. 6, there is shown a modified form of the invention where the pulley housing 13' is shaped for use where only two pulleys are used for the clothesline. Its end openings 14' and 15' are one hundred and eighty degrees apart to thereby provide a longer enclosed space through the pulley housing. This housing has a similar loop 31'. The same pulley element 21 having flange 23 is used and it depends from a pivot pin 17' that is secured to the housing 13', by welding material 18'. The central projection which supports pivot pin 17' as is indicated at 16' is shorter than the projection 16 of the housing 10. The housing 13 is sufficiently large so as to accommodate the knot 29 of the clothesline 24. The arcuate slot 30' in this pulley is likewise provided along with rounded ends 33' and 34' to guide the projections 28' of the clothespins 28 into the arcuate slot 30'.

It should now be apparent that there has been provided a pulley of the horizontal type which can readily accommodate the clothespin and a knot on the line so that the free movement of them can be had.

It will be also apparent that there has been provided loop means for securing the pulley to a hook or the like which is so shaped that the pulley when mounted thereon is rigidly retained in its horizontal position and parallel to the ground.

While various changes may be made in the detailed construction, it shall be understood that such changes shall be within the spirit and scope of the present invention as defined by the appended claims.

What is claimed is:

1. A horizontal type clothesline pulley comprising an arcuate shaped hollow body having open ends to receive a clothesline having knotted joined ends and a top overlying projection, a pivot pin depending from the underside of the top projection, a pulley element rotatable on said pivot pin and having a tapered recess and a bottom flared flange radially spaced from the hollow body and providing thereby an arcuate space between the hollow body and the pulley flange through which a depending clothespin may run, said hollow body providing an enlarged arcuate space through which the joined ends of the line may run, and a centering member mounted on the pivot pin and having a frusto-conical surface in contact with the tapered recess of the pulley element whereby the pulley element is restrained against radial displacement upon the pivot pin and the pivot pin is reinforced against lateral strain resulting from a weighted clothesline, said pivot pin passing axially through the frusto-conical centering member and the pulley element to hold the conical surfaces of the pulley element and centering member in contact with each other.

2. A horizontal type clothesline pulley as defined in claim 1, and said hollow body adjacent the outer ends of the arcuate space lying between the hollow body and the flange of the pulley element being cut away to facilitate the entrance of clothespins to the arcuate space as a weighted clothesline is pulled therethrough.

3. A horizontal type clothesline pulley as defined in claim 1, and said pivot pin being headed on its lower end, and a thrust washer supported on the head at the pivot pin, said pulley element resting upon the washer.

References Cited in the file of this patent

UNITED STATES PATENTS

| | | |
|---|---|---|
| 452,226 | Leuzinger | May 12, 1891 |
| 506,419 | Davidson | Oct. 10, 1893 |
| 961,796 | Reed | June 21, 1910 |
| 1,185,535 | Purdy | May 30, 1916 |
| 1,189,911 | Burris | July 4, 1916 |
| 1,635,145 | Taylor | July 5, 1927 |
| 1,952,940 | Rabelos | Mar. 27, 1934 |
| 2,481,695 | Scott | Sept. 13, 1949 |
| 2,517,249 | Serrell | Aug. 1, 1950 |